Aug. 2, 1955  S. J. SWIGGUM  2,714,524
CAMPING TRAILER WITH HINGED COVER AND ROOF EXTENSION
Filed Nov. 4, 1952  2 Sheets-Sheet 2

INVENTOR.
SYLVAN J. SWIGGUM
BY
ATTORNEY

United States Patent Office 2,714,524
Patented Aug. 2, 1955

2,714,524

CAMPING TRAILER WITH HINGED COVER AND ROOF EXTENSION

Sylvan J. Swiggum, El Monte, Calif.

Application November 4, 1952, Serial No. 318,642

4 Claims. (Cl. 296—23)

The present invention relates to ambulatory trailers in general and particularly to trailers adapted to be drawn by automobiles. More specifically the invention comprises a collapsible automobile trailer adapted to be expanded to provide sleeping and living quarters for two or more persons.

The automobile trailer drawn at high speeds along the American highways is commonplace today. These trailers can be divided broadly into two classes: a first class comprising house-type trailers the walls and bodies of which are permanently related to each other; and a second class comprising collapsible trailers, usually much lighter in weight than the first class and which are adapted to be collapsed or folded into a relatively small space for traveling purposes yet which can be opened up and expanded to provide sleeping and living quarters of larger dimensions. It is to this second class of trailers that the present invention relates.

The present invention in collapsible-type trailers comprises an improved construction in which a cover is adapted to be pivoted to open position and a hard top then displaced from an underlying position into an extended position in which it forms the roof of an adjacent room or enclosure. With an appreciation of the advantages inherent in collapsible-type trailers, and of the problems which characterize their construction and use, it is an object of the present invention to provide a new and improved collapsible-type trailer which provides an impervious hard top roof for an adjacent enclosure in the expanded open condition.

Another object of the invention is to provide an improved collapsible-type trailer in which a weather-impervious hard top roof member of an adjacent enclosure slides into underlying relationship with respect to the trailer cover in the collapsed condition of the unit to overlie the sleeping accommodations.

A further object of the invention is to provide a collapsible trailer having new and improved features.

These and other more specific features will appear upon reading the following specification and claims and upon considering in connection therewith the attached drawings to which they relate.

Referring now to the drawings in which a preferred embodiment of the invention is illustrated:

Figure 4 is an enlarged detail of the pivotal mounting of the roof brace.

Figure 1:
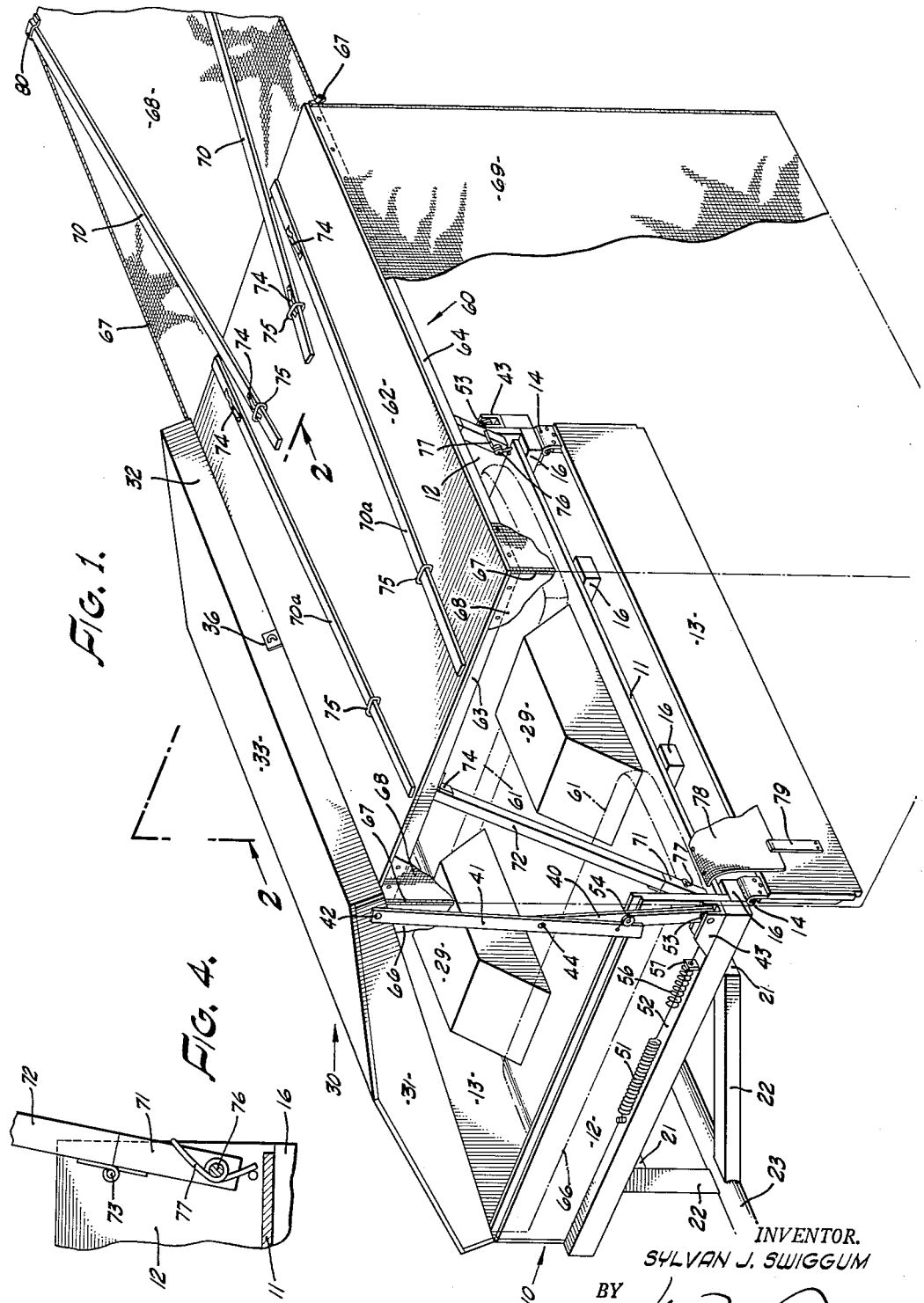
Figure 1 is a view in perspective of a trailer constructed in accordance with the present invention in its opened expanded condition.

In its preferred form the trailer constructed in accordance with the present invention comprises an open topped box-like body 10 including a bottom wall 11, end walls 12 and side walls 13. One of the latter is pivotally connected by hinges 14 to underlying transverse base members 16 by which the bottom 11 is reinforced. The body 10 may be made of wooden parts if desired although the exact material used is not of the essence. The body supported for movement over the highway by means of a chassis comprising longitudinally extending frame members 21 which underlie the members 16 of the body and which are connected at their forward ends by converging similarly sectioned members 22 between which extends a tongue element 23. The forward end of tongue 23 is adapted to be attached by suitable means to the pulling automobile.

An axle 26 of common design carrying pneumatically tired wheels 27 at its opposite ends is connected through leaf-type springs 28 to the chassis members 21. To lower the height of the body by accommodating the upper portion of the wheels 27 the floor 11 of the body 10 is formed centrally with transverse frustoconical wheel housings or wells 29, shown clearly in Figure 1. The extension of the upper portions of the wheels into these housings results in a lower center of gravity so that tilting, when taking turns at relatively high speeds, is reduced. Additionally a storage space is provided between the wells 29.

The open top of body 10 is, in the collapsed condition of the unit, closed by a cover assembly indicated generally by the reference character 30 and which is seen to include end walls 31, side walls 32 and sloping planar roof elements 33 which abut centrally of the cover and rest upon a ridge member 34. Cover 30 is dimensioned as to overlie the body 10 and to form a top therefor, the two units being pivotally connected by hinges 35 positioned as illustrated in Figures 2 and 3.

Figure 3:
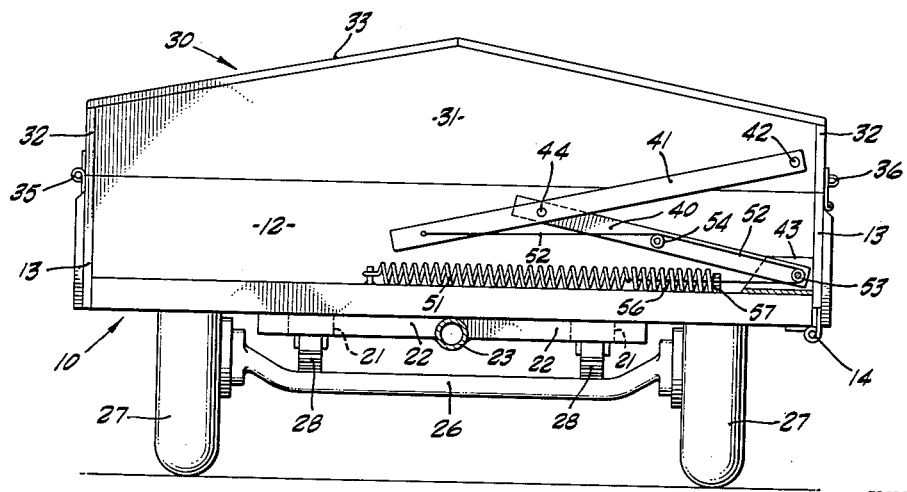
Figure 3 is an end view of the trailer in its collapsed condition ready for the road.

With the cover 30 pivoted to closed position with respect to the body 10, as illustrated in Figure 3, and with the side 13 pivoted to its upper closing position, the unit is retained in its closed relationship by cooperating latch elements indicated by the reference character 36 in Figure 3 and which may include an unshown removable lock if desired.

Figure 2:
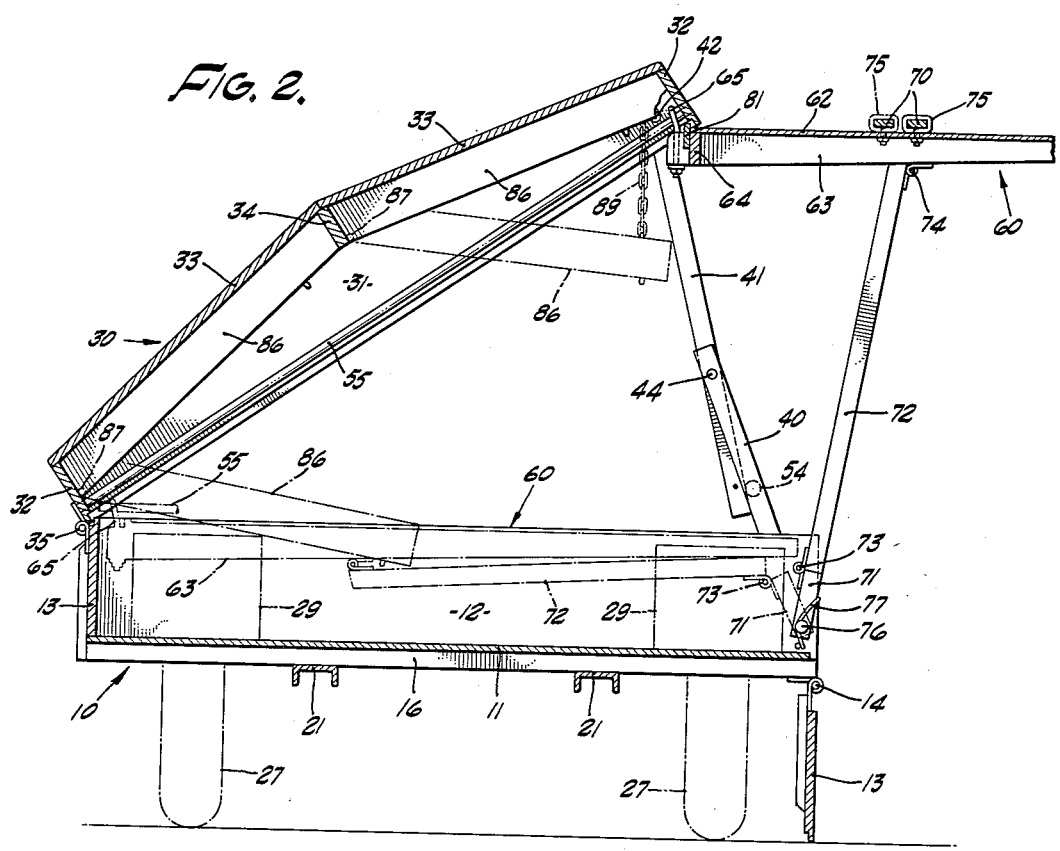
Figure 2 is a transverse section looking in the direction of the arrows upon the line 2—2 of Figure 1.

Cover 30 is adapted to be moved from its closed position, illustrated in Figure 3, to an open position as illustrated in Figures 1 and 2, and to be retained in the latter position by brace means included in the construction. These braces are positioned at the opposite ends of cover 30 and upon the side spaced from the hinges 35. Each brace comprises a leg member 41 pivoted at its upper end at 42 to the end member 31 of the cover and also a second leg member 40 pivotally connected at its lower end in a bracket 43 supported by the body 10 adjacent the plane of the floor 11. Legs 40 and 41 are pivotally connected at 44 and are movable between the collapsed position of Figure 3 and the extended cover-supporting position of Figures 2 and 4. The movement of the cover from its lowered to its raised position is accomplished by a manually exerted force at the upwardly moving side and is aided by the force exerted by a coiled tension spring 51. The latter is fixed at one end to the body 10 and is connected through a cable 52 passing around a pulley 53 in the bracket 43, and also around a second pulley 54 carried by lower leg 40 adjacent the lower end of leg 41. After passing over pulley 54 the cable 52 attaches to the lower end of leg 41. The relationship is such, as is clearly seen from a consideration of Figures 2 and 3, that the force exerted by spring 51 through the cable 52 tends to draw the brace legs 41 and 40 into alignment and thus aids in the raising operation. Additionally the pulley 54 provides an abutment for the lower end of leg 41 to determine the end position when in the straight line relationship.

A second coiled spring 56 is provided which also encircles the cable 52 and makes abutting contact at its end opposite the spring 51 with an abutment 57 through which the cable 52 passes. In the upward movement of the brace legs in the raising of the cover the spring 56 is initially somewhat compressed and exerts a helping lifting force through the cable 52 by acting against the end of spring 51. Also, as the cover is being lowered and the end of spring 51 abuts spring 56 the latter acts as a shock absorber or bumper to absorb the load as the cover moves into its final lowered position.

With the cover 30 raised into its upper position, as illustrated in Figures 1 and 2, and with the pivoted side 13 lowered as illustrated in the same figures, there is present a covered enclosure immediately above the body 10. The height of this is not sufficient, however, as to enable a person to stand and so this space is used to provide sleeping areas upon the opposite sides of the wheel well 29. These areas or portions of the floor 11 are covered by removable mattresses indicated by the reference character 61 which are understood to be conventional and preferably soft and resilient. Their length is the width of the body 10 which, in a preferred design, is approximately the width of the conventional automobile and so sufficiently long as to support the ordinary person comfortably.

It is also desirable, however, to provide a protected area adjacent the body 10 and this is readily accomplished in the present invention in which there is provided a rigid top member, indicated generally by the reference character 60, comprising a flat planar element 62. The length and breadth of element 62 are substantially those of body 10 and it is reinforced as desired and by means including end members 63 and side members 64.

The former may be of greater height at their inner or cover ends, as illustrated most clearly in Figure 2, and may extend slightly beyond the inner edge of the flat member 62 to provide in each instance a mounting or attaching portion for an eye bolt 65. The construction is the same at each end of the top 60 and is shown for one end in Figure 2. It is noted that the eye bolt 65 is tilted slightly at an angle and slidingly encloses an elongated rod 55 the ends of which are supported by the cover side walls 32. With the cover 30 in its collapsed condition top 60 underlies the cover 30, and as shown in dotted lines in Figure 2, having been lowered from its raised position shown in full lines in the same figure. The sliding relationship of the eye bolts 65 to the rods 55 makes this displacement simple and easy. In the inner or folded position, as illustrated in Figure 2 the side members 64 of top 60 lie immediately inside and adjacent the front and rear end members 12 of body 10. The left side of the top is supported by the eye bolt 65 and rod 55 while the right side is supported, with its edge just inside the adjacent side member 13 of body 10, by the lower leg 71 of the supporting strut which will now be described.

Obviously with the top 60 raised and extended outwardly from the cover 30, which is supported in its raised position by cooperating leg members 40 and 41, it is necessary to provide some means to support the top 60. These means comprise braces or struts at the opposite ends, each comprising a lower leg member 71 and a cooperating upper leg member 72 pivotally connected thereto at 73. Top strut member 72 is pivoted to the underside of the cover or top 60 at 74 while lower strut member 71 is pivoted at 76 to the adjacent end wall 12 of body 10. In the extended, raised position in which the strut supports the top 60 strut members 71 and 72 make end-to-end abutting contact, and any pivotal displacement, which would tend to disturb the end-to-end relationship, is prevented by the presence of a coil spring 77 one end of which abuts body 10 while its other end abuts one side of the strut member 71. The weight distribution of the top 60 is such that the top tends to pivot about the struts as pivot points forcing its end adjacent the cover upwardly. This transmits the entire supporting load to the struts.

With the top 60 in its stored position, as illustrated in dotted lines in Figure 2, the eye bolt 65 has traveled downwardly the entire length of the supporting rods 55 which movement has been accompanied by the pivoting of the upper strut member 72 about the pivot point 73 with respect to the lower strut member 71. In the final stored relationship strut member 72 underlies and extends substantially parallel to top member 60 while the lower strut member 71 performs a supporting function in a manner obvious from a consideration of Figure 2.

With the top 60 raised a roofed-shaded area is provided adjacent the trailer proper. It is desirable, however, to enclose this area for purposes of making an enclosure protected from the elements. Additionally it is desirable to close the triangular open ends of the trailer proper between the cover 30 in its raised position and the body 10. Those triangular ends of the trailer are closed by means of flexible fabric end walls of material such as canvas which are indicated by the reference character 66 and which are permanently secured along their marginal edges to the adjacent walls 12 of body 10 and cover 30. At its vertical edge wall member 66 is provided with a rapid closing means of the slide fastener type as indicated at 67, which includes cooperating means carried by an adjacent parallel wall member 68 which is secured along its upper edge to end frame member 63 of the top 60. Similar wall members 66 and 68 are secured at the opposite ends of the trailer and along its side defined by the member 64 is secured a side wall member 69. Manually operable quick closing means 67 are provided to connect the adjacent edges of each of the wall members.

With the wall members connected by their connectors 67 an enclosure is formed having the top 60 as its roof and the walls 68 and 69 as the ends and side. It may be desired to have the enclosure opened at one end to provide an adjacent porch and to accomplish this result means are provided by which one or both of the end walls 68 may be raised to provide an overhanging roof. In Figure 1 one of the walls 68 is shown so positioned and held horizontally by means of elongated rigid supporting elements 70 which are slidably supported upon the top 60 by means of U-shaped brackets 75. In the storage position the rods 70, and their counterparts 70a for the opposite end, extend within the length of the top 60 as shown in connection with elements 70a. But when it is desired to raise one of the end walls into a sheltering position as for example the distant end wall 68 in Figure 1, the elements 70 are slid longitudinally until their spring retainers 74 seat the top extension of fixed U-bracket 75 at which time they are retained in position. Their outer ends then extend into seats or sockets 80 formed to receive them in the lower corner of the wall 68, one such seat being shown in Figure 1 for purposes of illustration. Both end walls 68 may be raised simultaneously if desired, or if preferred, one of the end walls may be retained in its vertical closure-forming relationship while the opposite wall is raised as illustrated.

The enclosure formed under the top 60 and by the walls described is closed on its side adjacent the trailer proper by the trailer body and cover and by the side wall 13. The latter hangs downwardly from its pivotal hinges 14 and is of sufficient length to reach to the supporting surface to function as a support. To close the space which would otherwise be present between the upper edge of the side 13 in this lowered position and the floor 11 of the body 10 there is provided a sealing strip 78 secured at its upper edge to the floor 11 and connected by spaced straps 79 to body side wall 13. Straps 79 function to draw the sealing strip taut so that it functions to complement the side 13 in forming a complete closing wall between the supporting surface and the floor 11. This feature, while not essential, materially increases human comfort when a closed-in room effect is desired.

A further advantageous feature comprises the provision of a sealing weatherstrip 81 at the inner ends of the side members 63 of top 60. Weatherstrip 81 extends substantially vertically with the top in its horizontal position, as illustrated in Figure 2, and is rigidly connected to the side members 63 being so positioned that it extends just under and adjacent the grooved lower edge of the front side member 66 of the cover 30. But for the presence of sealing strip 81 there would be a considerable draft between the top and the cover and also leakage during heavy rains.

In the trailer constructed in accordance with applicant's invention storage means are available and are provided by pivoted drawers 86 carried by the cover 30. These drawers are shown in their closed and open positions in the full and dotted lines, respectively, in Figure 2. Each drawer 86 has an open top and is pivotally connected at its left end, as viewed in Figure 2, by pivots 87 to the cover 30. With the cover in raised position the drawers 86, of which there may be a plurality of separate parallel drawers spaced lengthwise of the body, or if preferred instead a single drawer of the entire length of the body, may be pivoted downwardly from the cover 30 to the dotted line position shown in Figure 2. The left-hand line of drawers so positioned would rest upon the wheel well 29 while the upper or right-hand line of drawers would be supported by means of chains 89, one of which is shown in Figure 2, which are secured at their upper ends to the cover 30. The drawers may be retained in their upper raised position by suitable latching means forming no part of the present invention, it being important only that they are so constructed and arranged as to be pivotable from lowered positions, in which their contents can be reached, to upper storage position in which they lie adjacent the cover 30.

The use and operation of the trailer constructed in accordance with the present invention is believed to be clear from the foregoing. When traveling on the boulevard or road the tongue 23 would be connected suitably to the rear of an automobile and a pulling force exerted therethrough, the body 10 and the cover 30 being in their closed relationship as viewed in Figure 3 with all parts of the enclosure-forming elements stored therebetween. It being desired to camp and to open the trailer into operative relationship the pivoted side 13 is lowered from its position shown in Figure 3 to that shown in Figures 1 and 2 and the cover 30 is then pivoted to its raised position by a force exerted along the right side as viewed in Figures 2 and 3, which lifting force is supplemented by the force of tension spring 51 exerted through cable 52, and in the initial stages of the movement by the force of spring 56.

With the cover raised as illustrated in Figure 2, it being desired to form the enclosure adjacent the trailer, the operator grasps the right-hand edge of top 60 and exerts a pulling force whereupon the eye bolts 65 at the inner side ride upwardly along the rods 55. As the top moves upwardly from its lowered dotted line position of Figure 2 to its upper full line position in the same figure the supporting strut legs 72 and 71 move into straight line alignment and with the top in the full raised position function to support its entire weight.

The top 60 is, in effect, pivotally supported by the legs 71, 72 and the center of gravity is to the right of these legs as viewed in Figure 2. As a result the left side of the top, as viewed in Figure 2 tends to pivot upwardly about the top of leg 72 as a pivot and exerts a lifting force on the outer upper edge of cover 30. There is, of course, no tendency under these conditions for the eye bolts 65 to slide back down the rods 55.

The closure walls 66, 68 and 69 may have already been attached or, if preferred, may now be attached, the wall 66 being secured along its edges to the cover 30 and also to the body 10, while walls 68 and 69 are attached only to the edge of the top 60. If desired, the walls are then connected along their adjacent edges by the quick closing means 67 to form an enclosure or, if preferred, one or more of the end walls 68 may be raised to form an overhanging awning as illustrated in Figure 1, the elements 70 performing the supporting function as previously described.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An ambulatory automobile trailer comprising an open-topped body having a side wall pivoted about a horizontal axis for movement into a downwardly depending position, a cover pivotally connected to said body along its side spaced from said pivoted side wall and including a top surface spaced from the upper edge of said body and sized as to overlie said body in one position, collapsible supporting means pivoted to said cover and to said body adjacent said pivotal side and movable between a collapsed position adjacent and between said body and cover and an extended aligned supporting position in which it extends therebetween and functions to support said cover in its raised position, and a rigid top member having a surface area substantially equal to the area of said body and slidingly supported by said cover at one of its sides for sliding movement between an underlying position, in which it is positioned below and within the horizontal limits of said cover, and a raised position in which it extends outwardly from said cover in a raised position of the latter and from its sliding support thereon and overhangs said body, and strut elements pivotally connected to said top at points spaced from the sliding support of the latter with said cover and to said body and pivotally interconnected as to be movable between a folded position in which they extend within said body with said top in its lowered position and in alignment in a second supporting position with said top in its raised position.

2. The construction recited in claim 1 characterized in that counterbalancing spring means are connected between said body and said collapsible supporting means pivotally connected to said cover and to said body to exert a force to move said collapsible supporting means from their collapsed to their aligned supporting position to assist in raising said cover to its upper position.

3. The construction recited in claim 1 characterized in that counterbalancing spring means are connected between said body and said collapsible supporting means pivotally connected to said cover and to said body to exert a force to move said collapsible supporting means from their collapsed to their aligned supporting position to assist in raising said cover to its upper position, said spring means including a tension coil spring and a cooperating compression coil spring arranged to supplement the force of said tension coil spring as said collapsible supporting means move initially from their collapsed position and said cover moves initially from its position overlying said body.

4. An ambulatory automobile trailer comprising an open-topped body having a pivoted wall, a cover pivotally connected to said body along its side spaced from said pivoted wall and including a top surface spaced from the upper edge of said body and sized as to overlie said body in one position, collapsible supporting means pivoted to said cover and to said body and movable between a collapsed position adjacent said body and cover and an extended aligned supporting position in which it extends therebetween and functions to support said cover in its raised position, and a rigid top member having a surface area substantially equal to the area of said body, said top member being connected at its opposite ends on one side for sliding movement along spaced rods carried by and underneath said cover for sliding movement between an underlying position, in which it is positioned below and within the horizontal limits of said cover, and a raised position in which it extends outwardly from said cover in a raised position of the latter and overhangs said body, and strut elements pivotally connected to said top and to said body and comprising in each instance an upper leg member extended parallel to the top in its lowered position and a lower leg member extended angularly relative thereto and in supporting relationship with said top in its lowered position said upper and lower leg members being movable into alignment in a second and supporting position with said top in its raised position.

References Cited in the file of this patent

UNITED STATES PATENTS

| Number | Name | Date |
|---|---|---|
| 1,821,593 | Van Vorst | Sept. 1, 1931 |
| 2,119,154 | Downing | May 31, 1938 |
| 2,168,661 | Anderson | Aug. 8, 1939 |
| 2,182,967 | Kors | Dec. 12, 1939 |
| 2,459,026 | Hardy | Jan. 11, 1949 |
| 2,496,055 | King | Jan. 31, 1950 |
| 2,582,635 | Kipple | Jan. 15, 1952 |